(12) United States Patent
Chuang et al.

(10) Patent No.: US 7,462,048 B2
(45) Date of Patent: Dec. 9, 2008

(54) ELECTRONIC COMPONENT EJECTION STRUCTURE OF ELECTRONIC DEVICE

(75) Inventors: Cheng-Hsiang Chuang, Taipei (TW); Yi-Hsun Hung, Taipei (TW)

(73) Assignee: Inventec Corporation, Taipei (TW)

( * ) Notice: Subject to any disclaimer, the term of this patent is extended or adjusted under 35 U.S.C. 154(b) by 24 days.

(21) Appl. No.: 11/702,108

(22) Filed: Feb. 5, 2007

(65) Prior Publication Data
US 2008/0186624 A1 Aug. 7, 2008

(51) Int. Cl.
*H01R 13/62* (2006.01)
(52) U.S. Cl. ..................................... 439/159
(58) Field of Classification Search .............. 439/159, 439/160
See application file for complete search history.

(56) References Cited

U.S. PATENT DOCUMENTS 5,825,616 A * 10/1998 Howell et al. .............. 361/684
6,319,029 B2 * 11/2001 Nishioka ..................... 439/159
2001/0008813 A1 * 7/2001 Nishioka ..................... 439/159

* cited by examiner

*Primary Examiner*—Tho D Ta
*Assistant Examiner*—Travis Chambers
(74) *Attorney, Agent, or Firm*—Rabin & Berdo, P.C.

(57) ABSTRACT

An electronic component ejection structure of an electronic device is provided. The ejection structure includes a guide element, a push rod, an elastic element, and a stopping element. The guide element is used to guide the push rod to move between a first and a second position. The stopping element has a hook and an abutting nose, wherein when the push rod is located at the first position, the hook is clipped into the clip hole; when the push rod is moved to the second position, the stopping element is driven to pivotally rotate and thereby removing the hook out of the clip hole; then, the electronic component is pushed out of the slot by the abutting nose. The elastic element is connected with the electronic device and the push rod, and it can push the push rod towards the first position, so as to repeatedly perform the ejecting operation.

12 Claims, 8 Drawing Sheets

ELECTRONIC COMPONENT EJECTION STRUCTURE OF ELECTRONIC DEVICE

BACKGROUND OF THE INVENTION

1. Field of the Invention

The present invention relates to an electronic component ejection structure of an electronic device, and more particularly, to an ejection structure utilizing the pivotally rotating of the stopping element driven by the push rod to release the clipping state with the electronic components, so as to eject the electronic component out of the slot of the electronic device.

2. Related Art

Referring to FIG. 1, when an electronic equipment 110 is mounted on an electronic part 120, in order to save the space for allocating the electronic part 120 into the electronic equipment 110, a clamping slot 111 is usually set in the electronic equipment 110 and a joint 121 is set on the end of the electronic part 120, so that when the electronic part 120 is disposed into the slot of the electronic equipment 110, the joint 121 is clamped and received by the clamping slot 111, so as to mount the electronic part 120 into the electronic equipment 110.

However, this way has an unavoidable defects. If the clamping force of the clamping slot is excessively strong, the user has to exert a large pull force to eject the part, and the joint is easily deformed if an inappropriate force is exerted. Moreover, the front end of the part must be protruded out of the electronic equipment, so as to facilitate ejecting the part out of the slot of the electronic equipment by the exerted pulling force. If the front end of the part and the external edge of the electronic equipment are located in the same plane, a push rod or a handle must be additional disposed to eject the part, and thereby occupying an additional outer space.

SUMMARY OF THE INVENTION

In view of the above, in order to solve the above problems and to align the external edge of the electronic device with the electronic component without occupying any additional outer allocation space, and in order to dispose the electronic component on the electronic device firmly and eject the electronic component from the electronic device easily, the present invention provides an electronic component ejection structure, which utilizes the moving of a stopping element driven by a push rod to release the clipping state between the stopping element and the electronic component, and pushes the electronic component towards a slot of the electronic device, so as to eject the electronic component out of the electronic device without exerting an additional force.

The present invention provides an electronic component ejection structure of an electronic device, which is applicable for an electronic component having a clip hole and being mounted within a slot of the electronic device. The electronic component ejection structure comprises at least one guide element, a push rod, an elastic element, and a stopping element. The guide element is disposed at the electronic device. The stopping element is pivotally disposed at the electronic device and has a hook and an abutting nose, and the hook is clipped into the clip hole. The push rod is guided by the guide element to move between a first position and a second position, and when the guide element moves from the first position to the second position, the push rod drives the guide element to pivotally rotate, so as to release the hook out of the clip hole and push the electronic component out of the slot by the abutting nose. The elastic element is connected to the electronic device and the push rod respectively, and has a normal force to push the push rod to move towards the first position, so as to return the push rod from the second position to the first position.

Moreover, the guide element can be designed as a guide post, and at least one glide chute is opened at the push rod for receiving the guide post, so as to guide the push rod to move, and the guide post has a strip-shaped or round cross section. Secondly, a press key is set on one end of the push rod corresponding to the stopping element and it is exposed out of the electronic device, and the press key protrudes out of the outer surface of the electronic device when the push rod is located at the first position. Thirdly, an interlocking post is set on the push rod, and an interlocking chute is opened at the stopping element for the interlocking post to move therein, and the stopping element is pivotally rotated driven by the push rod. Fourthly, the elastic element is an extension spring or a compression spring. Fifth, the guide element is set as a guide chute for receiving the push rod and the push rod moves along the guide chute.

The present invention has an efficacy that cannot be achieved in the conventional art, that is, the user can eject the electronic component by pushing the push rod without exerting an additional pulling force on the electronic component. Secondly, the electronic component is firmly mounted within the electronic device by clipping the hook into the clip hole. Thirdly, the guide structure can be optionally set as a guide chute or a guide post, which facilitates the utilization of the space within the electronic device. Fourthly, the front end of the electronic component can be aligned with the outer surface of the electronic device, so that holding structures such as a handle are not required, an thus no additional outer space is occupied.

Further scope of applicability of the present Invention will become apparent from the detailed description given hereinafter. However, it should be understood that the detailed description and specific examples, while indicating preferred embodiments of the Invention, are given by way of illustration only, since various changes and modifications within the spirit and scope of the Invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

In order to make the aforementioned objects, features, and functions of the present invention be more comprehensible, the present invention is described below in detail through perferred embodiments.

Figure 1:
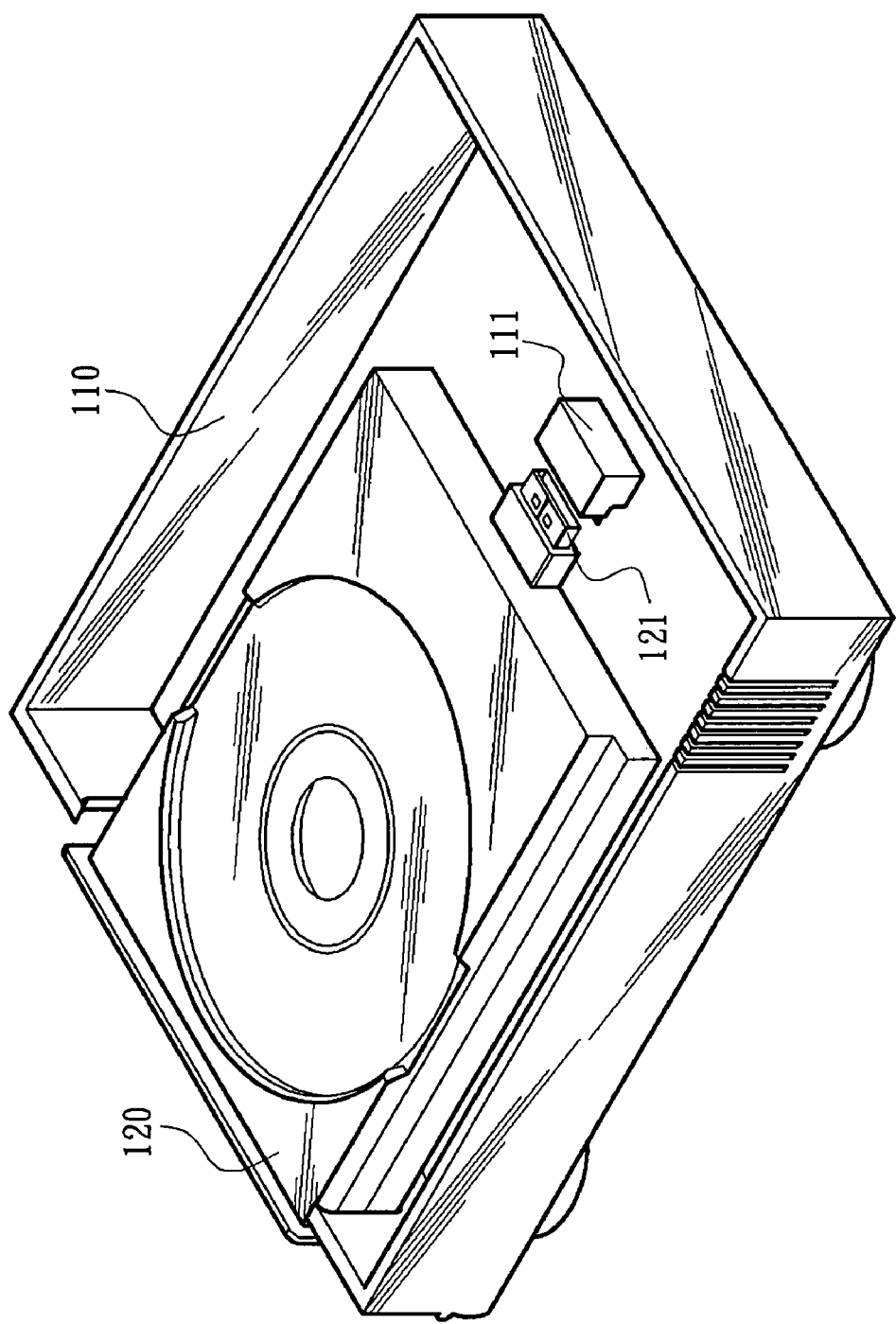
FIG. 1 is a schematic structural view of the conventional art.
Figure 2:
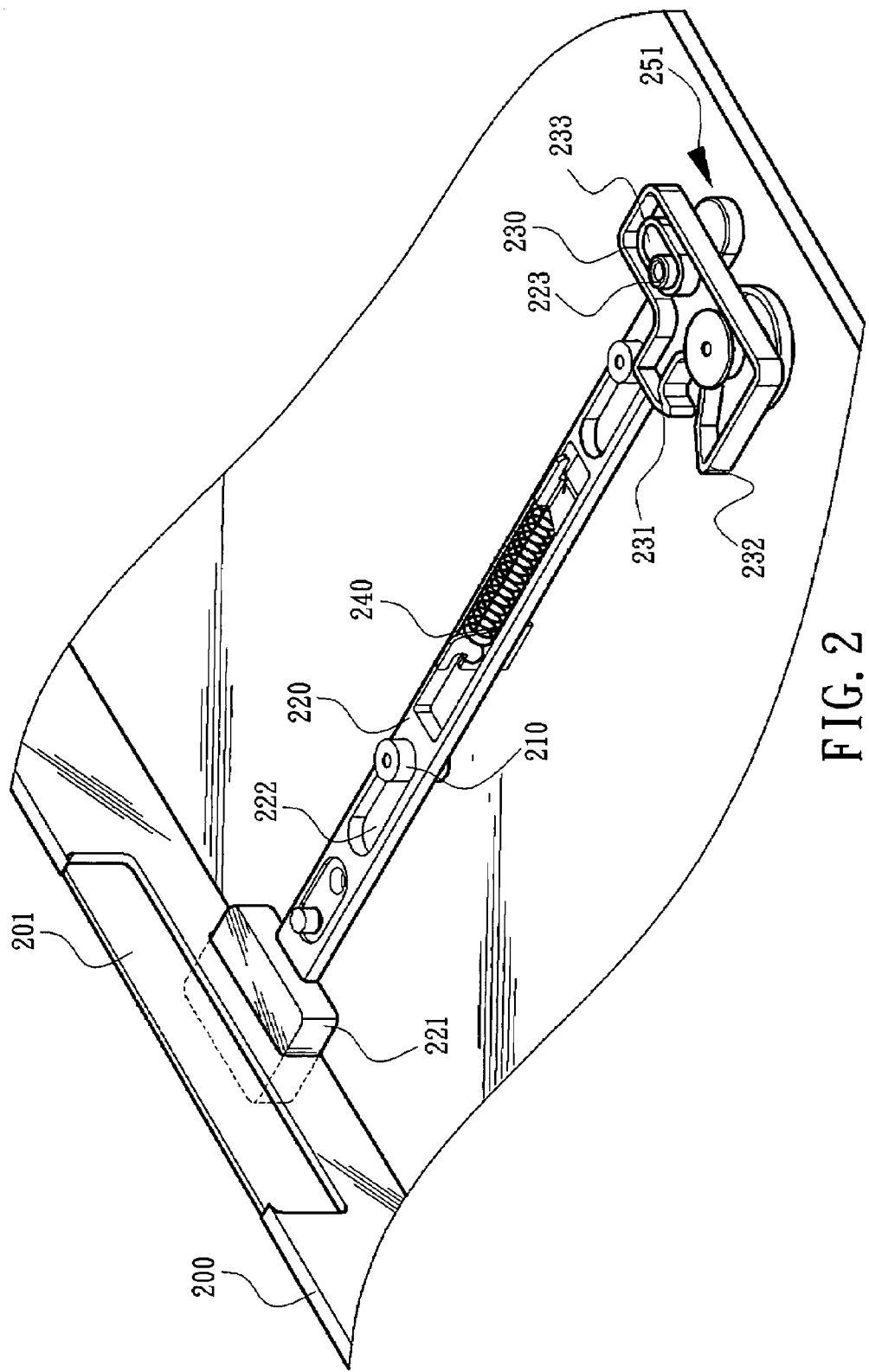
FIG. 2 is a schematic structural view of a first preferred embodiment of the present invention.

FIG. 2 is a schematic structural view of a first preferred embodiment of the present invention. The ejection structure is disposed in an electronic device 200 having a slot 201 and comprises a guide element 210, a push rod 220, a stopping element 230, and an elastic element 240.

The guide element 210, disposed at the electronic device 200, is mainly used for guiding the push rod 220 to move in a specific direction, and the guide element shown in the figures is a guide post with a round cross section.

The stopping element 230 is also pivotally disposed at the electronic device 200 and has a hook 231, an abutting nose 232, and an interlocking chute 233. The stopping element 230 is pivotally rotated relative to the electronic device 200, with the portion connected with the electronic device 200 as the axle center.

The push rod 220 has a press key 221, a glide chute 222, and an interlocking post 223. The press key 221 is disposed on one end of the push rod 220 opposite to the location of the stopping element 230, and the press key 221 protrudes out of the outer surface of the electronic device 200. The glide chute 222 is used for receiving the guide element 210 to guide the moving path of the push rod 220, so as to move the push rod 220 between a first position 251 (the position shown in FIG. 3A) and a second position 252 (the position shown in FIG. 4A). In this embodiment, the glide chute 222 is used for receiving the guide post with a round cross section. However, in order to prevent the push rod 220 from shifting away from the moving direction, two sets of glide chutes 222 are disposed on the push rod, which are located on the same axis; and two sets of guide posts are disposed on the electronic device 200, and they are respectively received in the two glide chutes, so that the shifting is avoided when the push rod 220 is pushed to move, and the push rod 220 is ensured to move between the first position 251 and the second position 252. An interlocking post 223 is received in an interlocking chute 233, and when the push rod 220 moves, the interlocking post 223 is made to bear against the internal edge of the interlocking chute 233 and exert a pushing force to push the stopping element 230 to pivotally rotate.

The elastic element 240 is disposed to connect the push rod 220 with the electronic device 200, and has a normal force for pushing the push rod 220 to move towards the first position 251, so that when the push rod 220 is located at the second position, the push rod 220 is pulled back by the elastic element 240 to return to the first position 251.

Figure 3A:
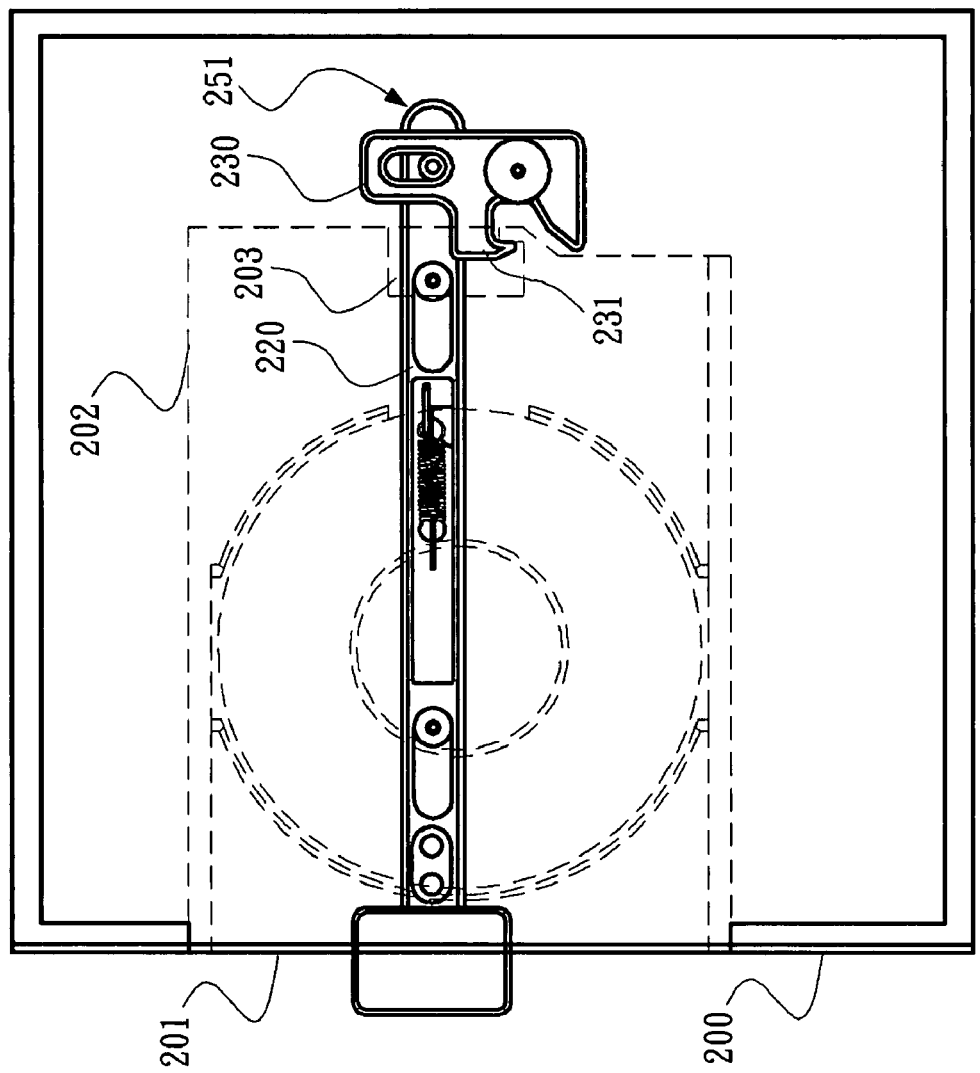
FIG. 3A is a schematic top view of a clipped electronic component of the present invention.
Figure 3B:
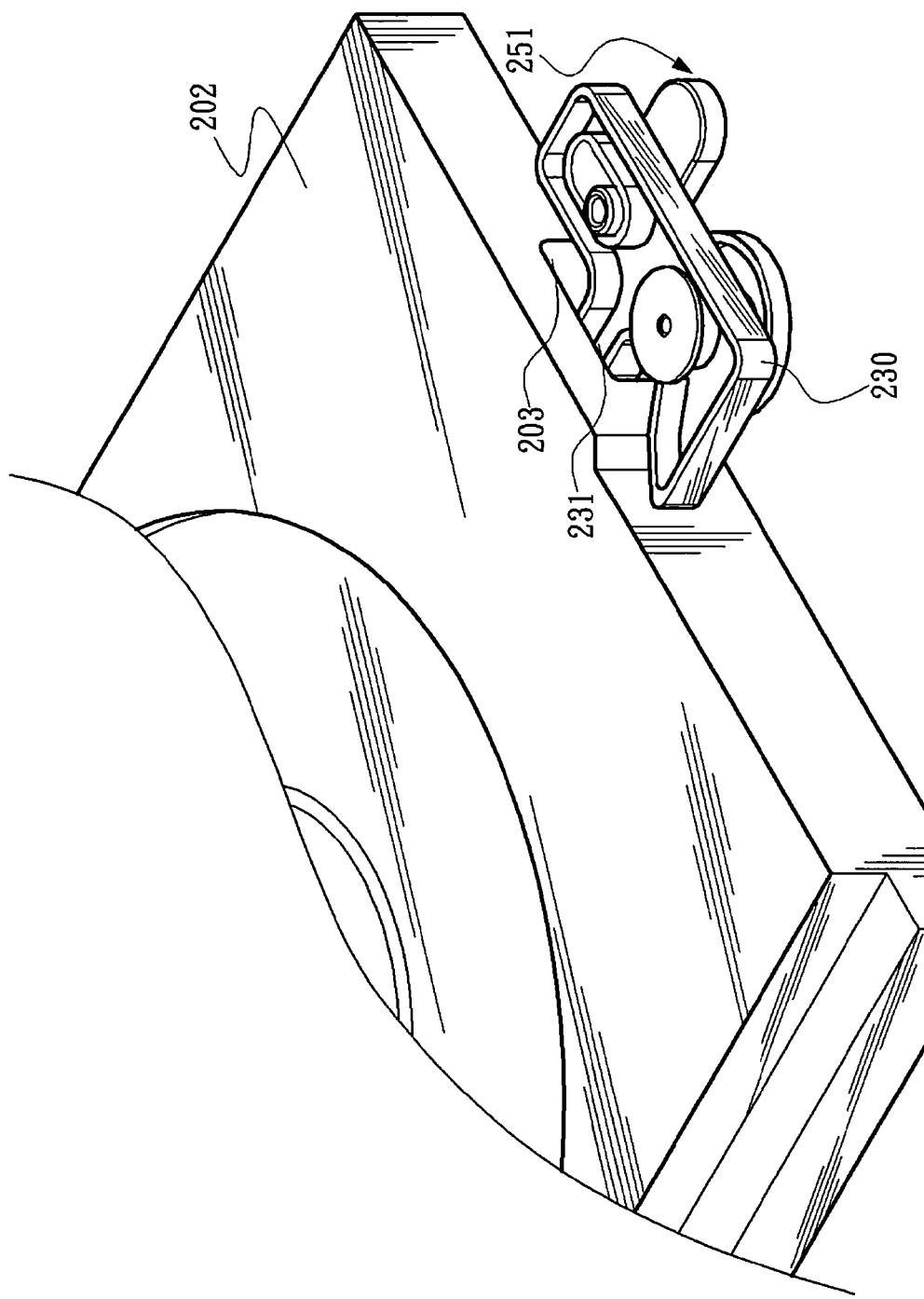
FIG. 3B is a partially schematic top view of the clipped electronic component of the present invention.

FIGS. 3A and 3B are respectively a top view and a schematic structural view of a clipped electronic component of the present invention. The electronic component 202 is disposed in the slot 201 of the electronic device 200. In this embodiment, the electronic component 202 has a clip hole 203. When the push rod 220 is located in the first position 251, the hook 231 of the stopping element 230 is clipped into the clip hole 203, and thereby fixing the electronic component 202 in the electronic device 200.

Figure 4A:
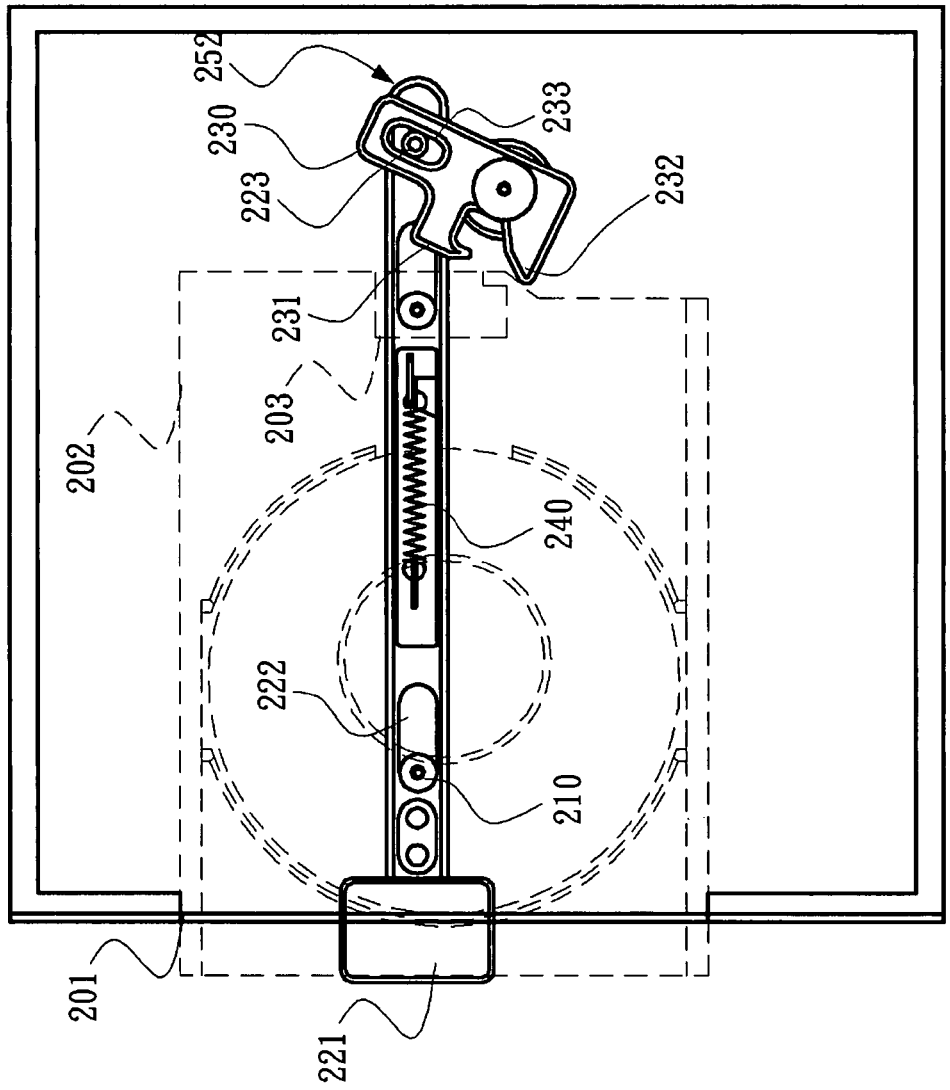
FIG. 4A is a schematic top view of an ejected electronic component of the present invention.
Figure 4B:
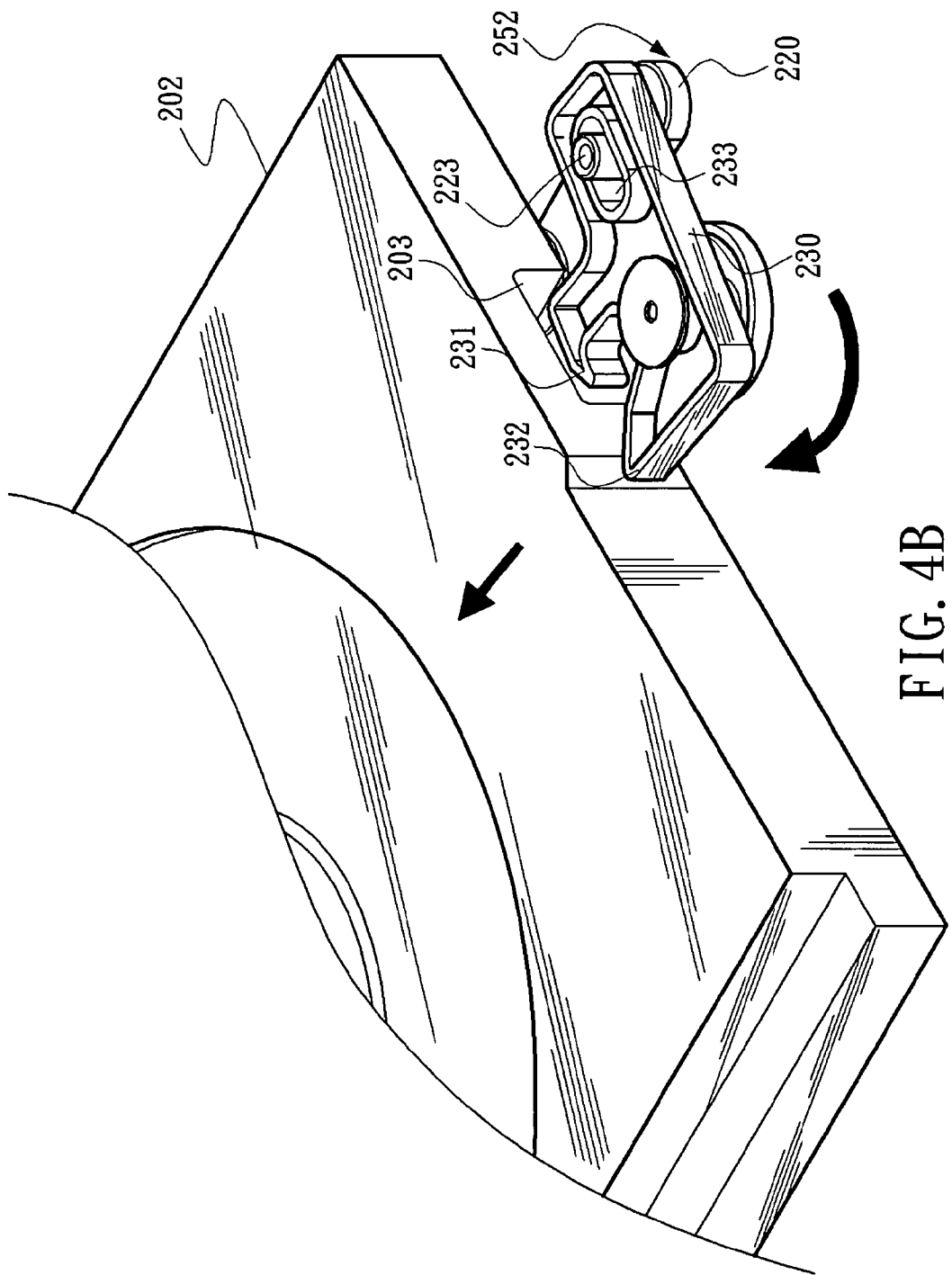
FIG. 4B is a partially schematic top view of the ejected electronic component of the present invention.

FIGS. 4A and 4B are respectively a top view and a schematic structural view of an ejected electronic component of the present invention, wherein the electronic component 202 is ejected from the slot 201 of the electronic device 200. First of all, the press key 221 is pressed to produce a pushing force, and the push rod 220 is pushed by the force to move towards a specific direction. Meanwhile, the push rod 220 is guided by the guide element 210 through the glide chute 222, and thus the push rod 220 is made to move towards the second position 252 accurately. At this time, the interlocking post 223 slides within the interlocking chute 233, and the interlocking post 223 bears against the interlocking chute 233, so as to transfer the pushing force exerted on the push rod 220 to the stopping element 230, thereby driving the stopping element 230 to pivotally rotate accordingly. The pivotally rotating of the stopping element 230 will cause the hook 231 to move away from the chip hole 203, so as to release the clipping state between the clip hole 203 and the hook 231. Then, the abutting nose 232 bears against the electronic component 202, and a pushing force is produced by the pivotally rotating of the stopping element 230 to push the electronic component 202 to move, so as to eject the electronic component 202 from the slot 201. Then, the push rod 220 is pushed by the elastic element 240 back to the first position 251, so as to repeatedly perform the ejecting operation.

Figure 5:
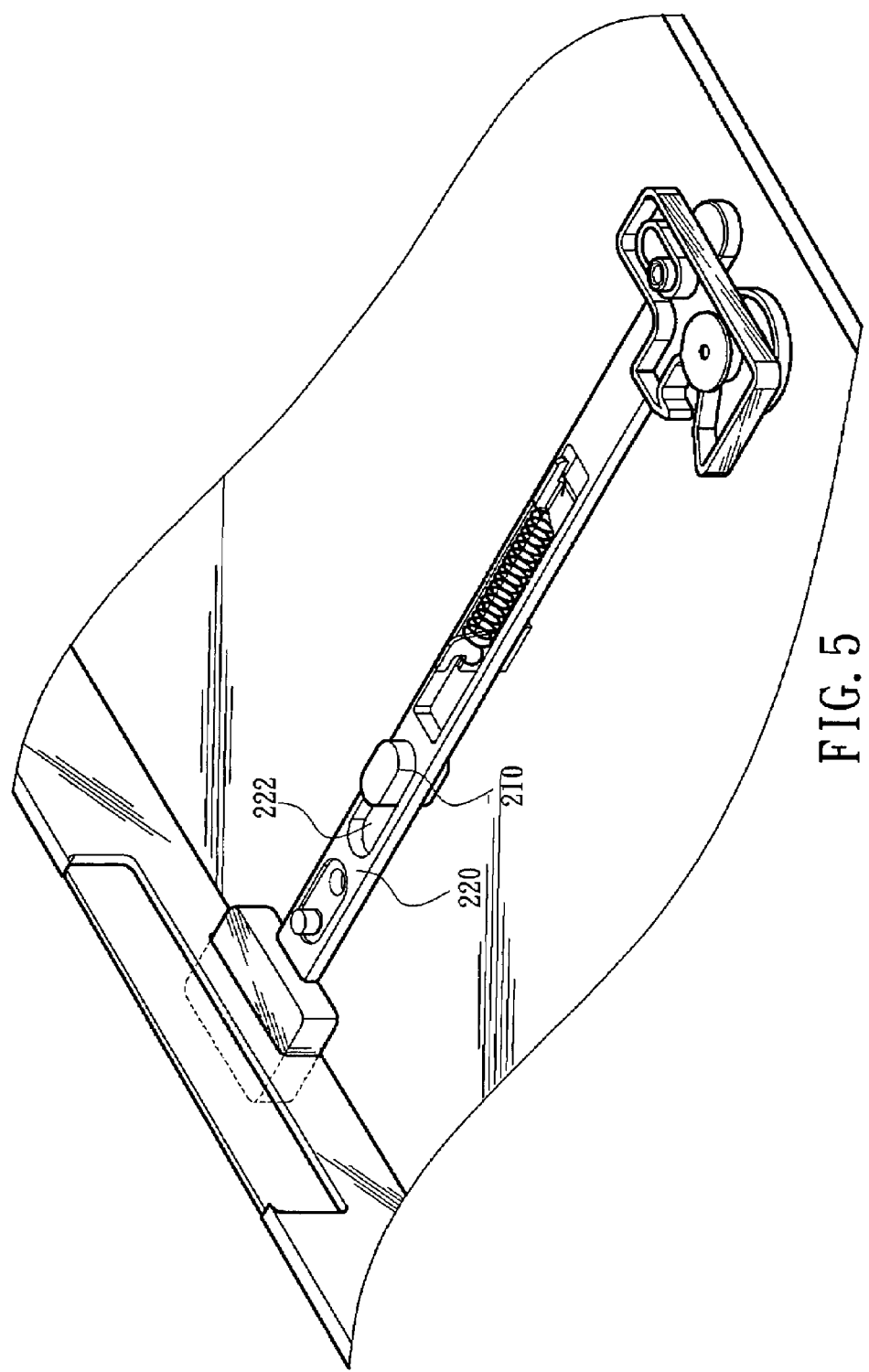
FIG. 5 is a schematic structural view of a second preferred embodiment of the present invention.

FIG. 5 is a schematic structural view of a second preferred embodiment of the present invention. The guide element 210 is designed as a guide post with a strip-shaped cross section, which is also received in the glide chute 222 as the guide post with a round cross section. The difference lies in that, only one guide post is required to be matched with the glide chute 222, and the strip shape itself of the guide post can ensure the moving direction of the push rod is accurately guided, thereby saving the cost as well as the space for allocation.

Figure 6:
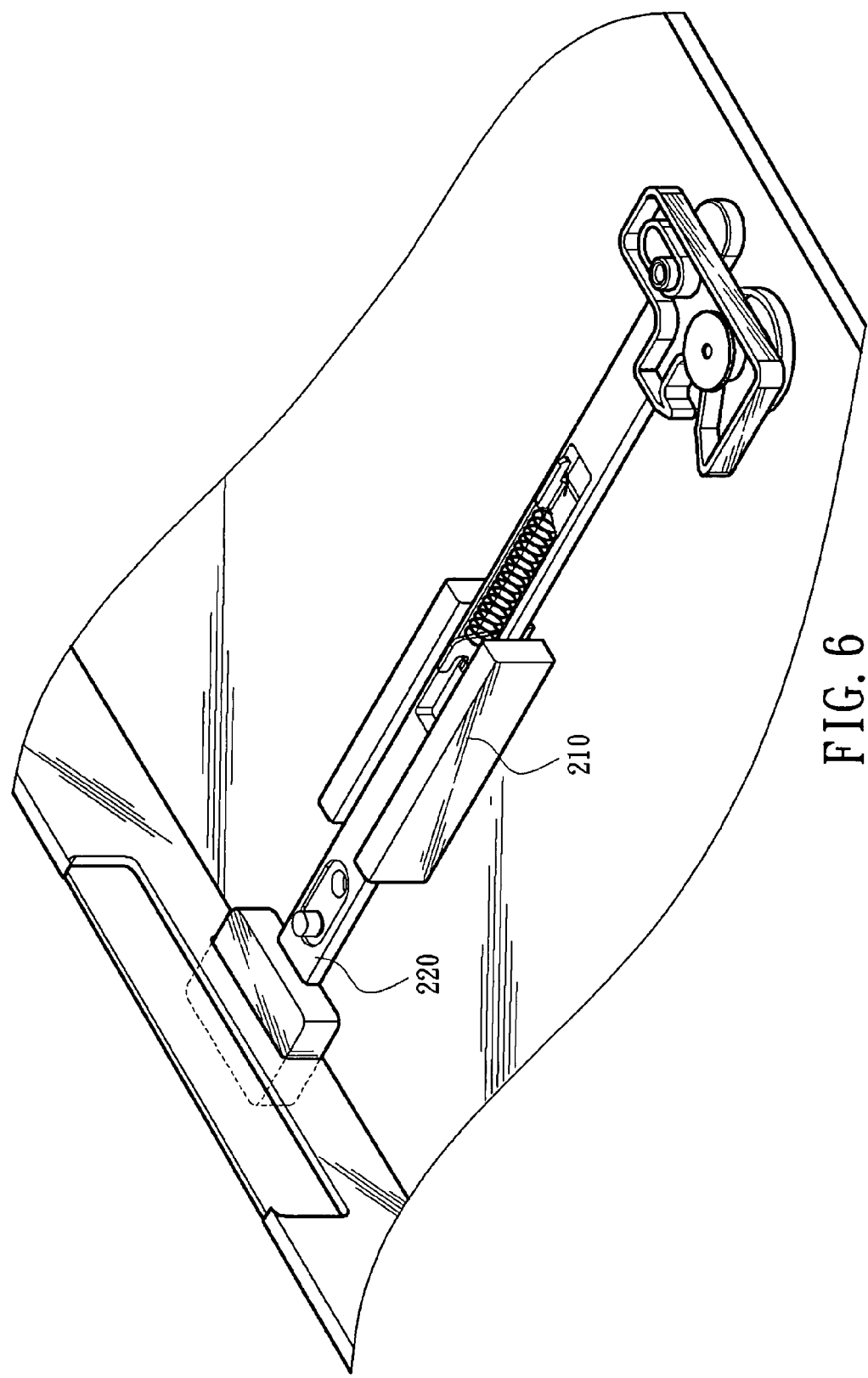
FIG. 6 is a schematic structural view of a third preferred embodiment of the present invention.

FIG. 6 is a schematic structural view of a third preferred embodiment of the present invention. The guide element 210 is designed as a guide chute. The guide chute is a bar-shaped glide chute for receiving the push rod 220 therein and forcing the push rod 220 to move in a linear way.

The invention being thus described, it will be obvious that the same may be varied in many ways. Such variations are not to be regarded as a departure from the spirit and scope of the Invention, and all such modifications as would be obvious to one skilled in the art are intended to be included within the scope of the following claims.

What is claimed is:

1. An electronic component ejection structure of an electronic device, wherein an electronic component is disposed within a slot of the electronic device and the electronic component has a clip hole, the electronic component ejection structure comprising:
   at least one guide post, disposed at the electronic device;
   a push rod having a glide chute that receives the guide post, the push rod being guided by the guide post when the push rod is moved between a first position and a second position;
   an elastic element, having two ends respectively connected with the electronic device and the push rod, and moving the push rod towards the first position; and
   a stopping element, pivotally disposed at the electronic device and pivotally rotating upon being driven by the push rod and having a hook and an abutting nose, wherein when the push rod is located in the first position, the hook is clipped in the clip hole; when the push rod moves from the first position to the second position, the hook is released from the clip hole, and the abutting nose pushes the electronic component out of the slot.

2. The electronic component ejection structure as claimed in claim 1, wherein a cross section of the guide post is strip-shaped.

3. The electronic component ejection structure as claimed in claim 1, wherein a cross section of the guide post is round.

4. The electronic component ejection structure as claimed in claim 1, wherein the push rod has an interlocking post, the stopping element comprises an interlocking chute, the interlocking post moves within the interlocking chute, and when the push rod moves between the first position and the second position, the push rod drives the stopping element to pivotally rotate.

5. The electronic component ejection structure as claimed in claim 1, wherein the elastic element is an extension spring.

6. An electronic component ejection structure of an electronic device, wherein an electronic component is disposed within a slot of the electronic device and the electronic component has a clip hole, the electronic component ejection structure comprising:
- at least one guide element, disposed at the electronic device;
- a push rod comprising a press key disposed on one end thereof and being exposed out of the electronic device, the push rod being guided by the guide element to move between a first position and a second position;
- an elastic element, having two ends respectively connected with the electronic device and the push rod, and moving the push rod towards the first position; and
- a stopping element, pivotally disposed at the electronic device, corresponding to the press key, and pivotally rotating upon being driven by the push rod and having a hook and an abutting nose, wherein when the push rod is located in the first position, the hook is clipped in the clip hole; when the push rod moves from the first position to the second position, the hook is released from the clip hole, and the abutting nose pushes the electronic component out of the slot.

7. The electronic component ejection structure as claimed in claim 6, wherein the guide element is a guide post, and the push rod has at least one glide chute for receiving the guide posts, so as to guide the push rod between the first position and the second position.

8. The electronic component ejection structure as claimed in claim 6, wherein when the push rod is located in the first position, a pressing surface of the press key protrudes out of an outer surface of the electronic device.

9. The electronic component ejection structure as claimed in claim 6, wherein the push rod has an interlocking post, the stopping element comprises an interlocking chute, the interlocking post moves within the interlocking chute, and when the push rod moves between the first position and the second position, the push rod drives the stopping element to pivotally rotate.

10. The electronic component ejection structure as claimed in claim 6, wherein the elastic element is an extension spring.

11. The electronic component ejection structure as claimed in claim 6, wherein the guide element is a guide chute for receiving the push rod and making the push rod move between the first position and the second position along the guide chute.

12. An electronic component ejection structure of an electronic device, wherein the electronic component is disposed within a slot of the electronic device and the electronic component has a clip hole, the electronic component ejection structure comprising:
- at least one guide post, disposed at the electronic device;
- a push rod, having a press key protruding out of an outer surface of the electronic device, a glide chute for receiving the guide post, and an interlocking post, wherein upon being pressed by the press key, the push rod is guided by the guide post to move between a first position and a second position;
- an elastic element, having two ends respectively connected with the electronic device and the push rod, and moving the push rod to move towards the first position, wherein the elastic element is an extension spring and a compression spring; and
- a stopping element, pivotally disposed at the electronic device and having a hook, an abutting nose, and an interlocking chute for receiving the interlocking post, wherein when the push rod is located at the first position, the hook is clipped into the clip hole; when the push rod moves from the first position to the second position, the interlocking post freely slides within the interlocking chute to drive the stopping element to pivotally rotate, so that the hook is released away from the clip hole, and then the abutting nose pushes the electronic component out of the slot.

* * * * *